United States Patent
Matsunaga

(10) Patent No.: US 10,723,179 B2
(45) Date of Patent: Jul. 28, 2020

(54) TIRE

(71) Applicant: BRIDGESTONE CORPORATION, Tokyo (JP)

(72) Inventor: Midori Matsunaga, Tokyo (JP)

(73) Assignee: BRIDGESTONE CORPORATION, Tokyo (JP)

(*) Notice: Subject to any disclaimer, the term of this patent is extended or adjusted under 35 U.S.C. 154(b) by 0 days.

(21) Appl. No.: 16/089,280

(22) PCT Filed: Mar. 24, 2017

(86) PCT No.: PCT/JP2017/011966
§ 371 (c)(1),
(2) Date: Sep. 27, 2018

(87) PCT Pub. No.: WO2017/170208
PCT Pub. Date: Oct. 5, 2017

(65) Prior Publication Data
US 2019/0118585 A1  Apr. 25, 2019

(30) Foreign Application Priority Data
Mar. 28, 2016 (JP) .................................. 2016-063787

(51) Int. Cl.
| | | |
|---|---|---|
| *B60C 11/13* | (2006.01) | |
| *B60C 11/03* | (2006.01) | |
| *B60C 11/12* | (2006.01) | |

(52) U.S. Cl.
CPC .......... *B60C 11/1353* (2013.01); *B60C 11/03* (2013.01); *B60C 11/12* (2013.01);
(Continued)

(58) Field of Classification Search
CPC ......... B60C 11/1353; B60C 2011/1361; B60C 11/1307; B60C 11/1369; B60C 11/0302;
(Continued)

(56) References Cited

U.S. PATENT DOCUMENTS 5,746,849 A * 5/1998 Hutson ............... B60C 11/0302
152/209.22
2010/0038001 A1 2/2010 Yamaguchi
(Continued)

FOREIGN PATENT DOCUMENTS

JP          05254311 A   * 10/1993
JP        2004-224268 A     8/2004
(Continued)

OTHER PUBLICATIONS

Machine Translation: JP-2005112030-A; Kawaguchi, Mayumi; (Year: 2019).*

(Continued)

*Primary Examiner* — Kendra Ly
(74) *Attorney, Agent, or Firm* — Oliff PLC

(57) ABSTRACT

A tire has a tread portion including a groove extending in the tire-circumferential direction, a first land portion positioned to the inner-side in the tire-width direction and having a first groove wall of the groove, and a second land portion having a second groove wall. Protrusions extend from the first groove wall to the second groove wall on bottom of the groove. In a tread-surface view, the protrusion has a linear portion and a curved portion that is contiguous with the linear shaped portion. A slit crossing the protrusion is formed in at least one of the end parts of the protrusions. The first land portion includes shallow grooves having shallower depth than the groove and extending at an angle with respect to the tire-width direction. The linear portion of the protrusion extends at an angle in the same direction, with respect to the tire-circumferential direction, as the shallow grooves.

9 Claims, 9 Drawing Sheets

(52) U.S. Cl.
CPC ... *B60C 11/1307* (2013.01); *B60C 2011/0351* (2013.01); *B60C 2011/1338* (2013.01); *B60C 2011/1361* (2013.01)

(58) Field of Classification Search
CPC ..... B60C 2011/1338; B60C 2011/0362; B60C 2011/0381; B60C 2011/1231
USPC ........................................ 152/209.19–209.22
See application file for complete search history.

(56) References Cited

U.S. PATENT DOCUMENTS

| | | | |
|---|---|---|---|
| 2012/0168048 A1* | 7/2012 | Suganuma | B60C 11/04 152/209.18 |
| 2012/0273106 A1* | 11/2012 | Kiwaki | B60C 11/0302 152/209.18 |
| 2013/0276947 A1 | 10/2013 | Oogane | |
| 2014/0174617 A1* | 6/2014 | Kiwaki | B60C 11/13 152/209.18 |
| 2015/0343849 A1 | 12/2015 | Tanaka et al. | |

FOREIGN PATENT DOCUMENTS

| | | | |
|---|---|---|---|
| JP | 2005112030 A | * | 4/2005 |
| JP | 2008-302740 A | | 12/2008 |
| JP | 2011235741 A | * | 11/2011 |
| JP | 2012-116339 A | | 6/2012 |
| JP | 2014-012485 A | | 1/2014 |
| JP | 2014-218232 A | | 11/2014 |
| WO | 2008/114668 A1 | | 9/2008 |
| WO | 2012/090917 A1 | | 7/2012 |

OTHER PUBLICATIONS

Machine Translation: JP-2011235741-A; Kiwaki, Koyo; (Year: 2019).*
Machine Translation: JP-05254311-A; Nakagawa, Masao; (Year: 2019).*
Feb. 20, 2019 Search Report issued in European Patent Application No. 17774745.8.
Jun. 27, 2017 International Search Report issued in International Patente Application No. PCT/JP2017/011966.

* cited by examiner

TIRE

TECHNICAL FIELD

The present invention relates to a tire in which a groove portion extending in the tire circumferential direction is formed in a tread portion.

BACKGROUND ART

Conventionally, various methods have been used for a pneumatic tire (hereinafter referred to as a tire) to be mounted on a vehicle in order to suppress a rise in the temperature of the tire caused by travelling of the vehicle. In particular, in a heavy duty tire mounted on a truck, a bus or the like, a temperature rise is remarkable.

Therefore, in the tire with a groove portion extending in the tire circumferential direction and being formed in the tread portion of the tire, and a rib-shaped land portion partitioned by the groove portion, a tire is offered in which the groove bottom of the groove portion has a protrusion extending linearly from one groove wall to the other groove wall (Patent Literature 1).

With such a tire, when the tire rolls, the airflow passing through the inside of the groove portion becomes a turbulent flow due to the protrusion portion, and heat radiation from the tread portion is promoted by this turbulent flow. This makes it possible to suppress the temperature rise of the tread portion.

CITATION LIST

Patent Literature

Patent Literature 1: WO2012/090917 A

SUMMARY OF INVENTION

Technical Problem

At the time of tire rolling, the land portions on both sides of the groove portion undergo compression deformation when contacting the road surface, and bulge and deform in a direction in which the groove width narrows. Then, when the land portions on both sides of the groove portion are separated from the road surface, the bulging deformation returns to the original state. As described above, the land portions on both sides of the groove portion repeat bulging deformation in a direction in which the groove width becomes narrower each time the land portions contact the road surface, so that the protrusion formed in the groove portion receives compressive force repeatedly from one groove wall side and the other groove wall side.

In the tire with a conventional technique, the protrusion is linearly continuous from one groove wall to the other groove wall, and when such a protrusion repeatedly receives compressive force from both sides, the center of the protrusion in the tire width direction has the shear deformation locally and repeatedly, and cracks may occur in the protrusion.

If such cracks are generated at the protrusions, the intended turbulence may not be generate by the protrusions, and the effect of suppressing the temperature rise of the tread portion may be deteriorated, and measures have been desired.

Furthermore, in the tire with the conventional technique, since the temperature rise due to deformation of the rubber of the tread portion is remarkable in the initial stage of wear of the tire in which the rubber gauge (rubber thickness) of the tread portion is thick and the rubber volume is large, it is desired to take measures.

The present invention has been made in view of the above problems, and it is an object of the present invention to provide a tire capable of reliably suppressing a rise in temperature of a tread portion while enhancing durability of a protrusion by suppressing cracks from occurring to the protrusion formed in the groove portion.

Solution to Problem

A tire according to an aspect of the present invention has a tread portion (10) which includes a groove portion extending in the tire circumferential direction, a first land portion positioned toward an inner side in a tire width direction and having a first groove wall forming the groove portion, and a second land portion facing the first land portion in the tire width direction and having a second groove wall forming the groove portion. A protrusion continuing from the first groove wall to the second groove wall is provided at a groove bottom of the groove portion continuing to the first groove wall and the second groove wall. In a tread surface view of the tire, the protrusion includes a linear portion extending linearly, and at least one curved portion continuing to the linear portion and curved toward the tire circumferential direction. At least one of a first end of the protrusion connected to the first groove wall and a second end of the protrusion connected to the second groove wall has a slit crossing the protrusion. The first land portion has a shallow groove whose depth is shallower than a depth of the groove portion in the tire radial direction, the shallow groove extending at an angle with respect to the tire width direction, and being open to the groove portion. The linear portion of the protrusion extends at an angle in a direction that is identical to a direction in which the shallow groove extends at an angle with respect to the tire circumferential direction TC.

Advantageous Effects of Invention

The tire according to the aspect of the present invention reliably suppress a rise in temperature of a tread portion while enhancing durability of a protrusion by suppressing cracks from occurring to the protrusion formed in the groove portion.

DESCRIPTION OF EMBODIMENTS

First Embodiment

(1) Schematic Configuration of Tire

A first embodiment of a tire according to the present invention will be described with reference to the drawings. First, a schematic configuration of the tire 1 according to the present embodiment will be described with reference to FIGS. 1 and 2.

Figure 1:
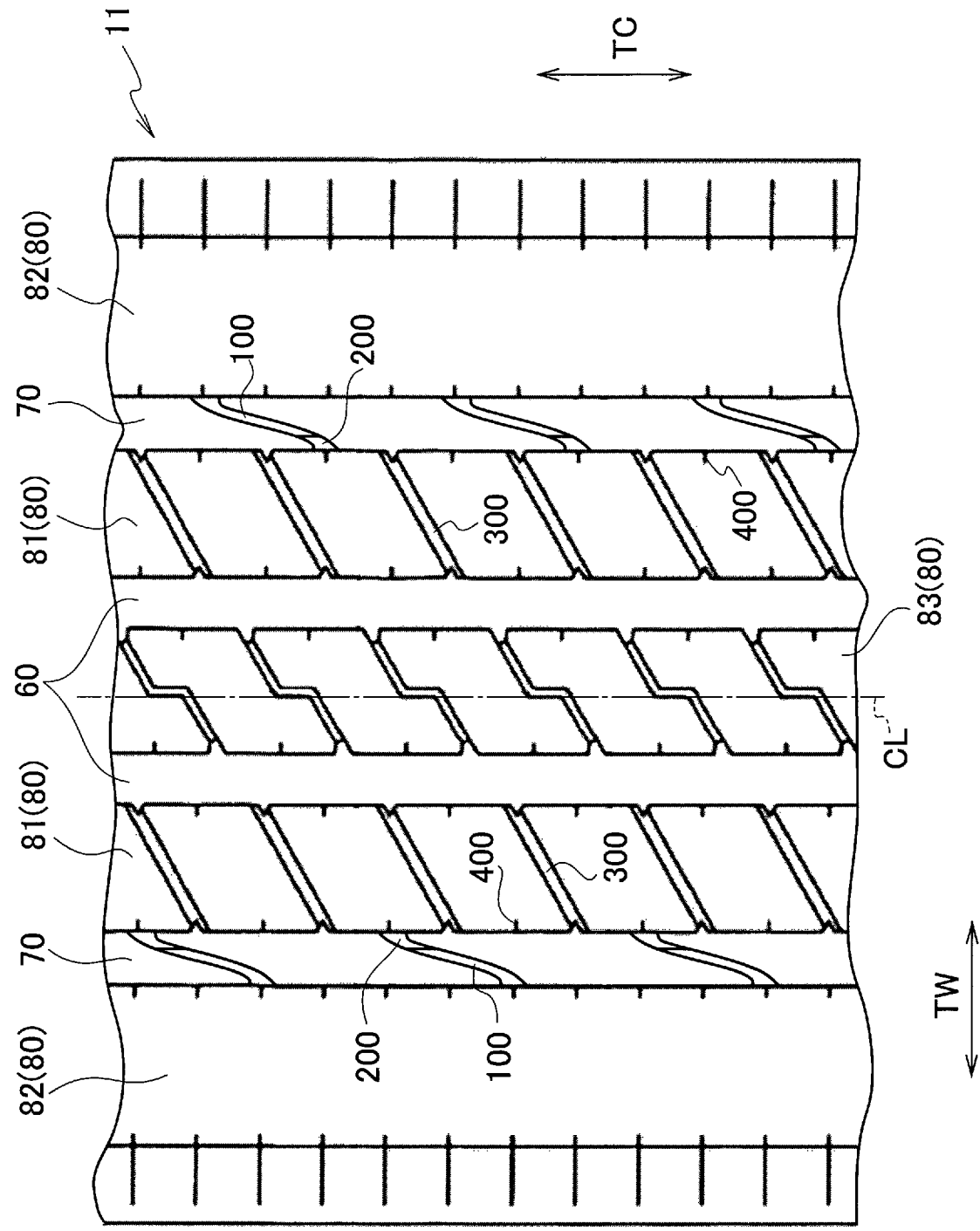
FIG. 1 is a development view of part of a tread grounding face 11 of a tire 1 according to a first embodiment of the present invention.
Figure 2:
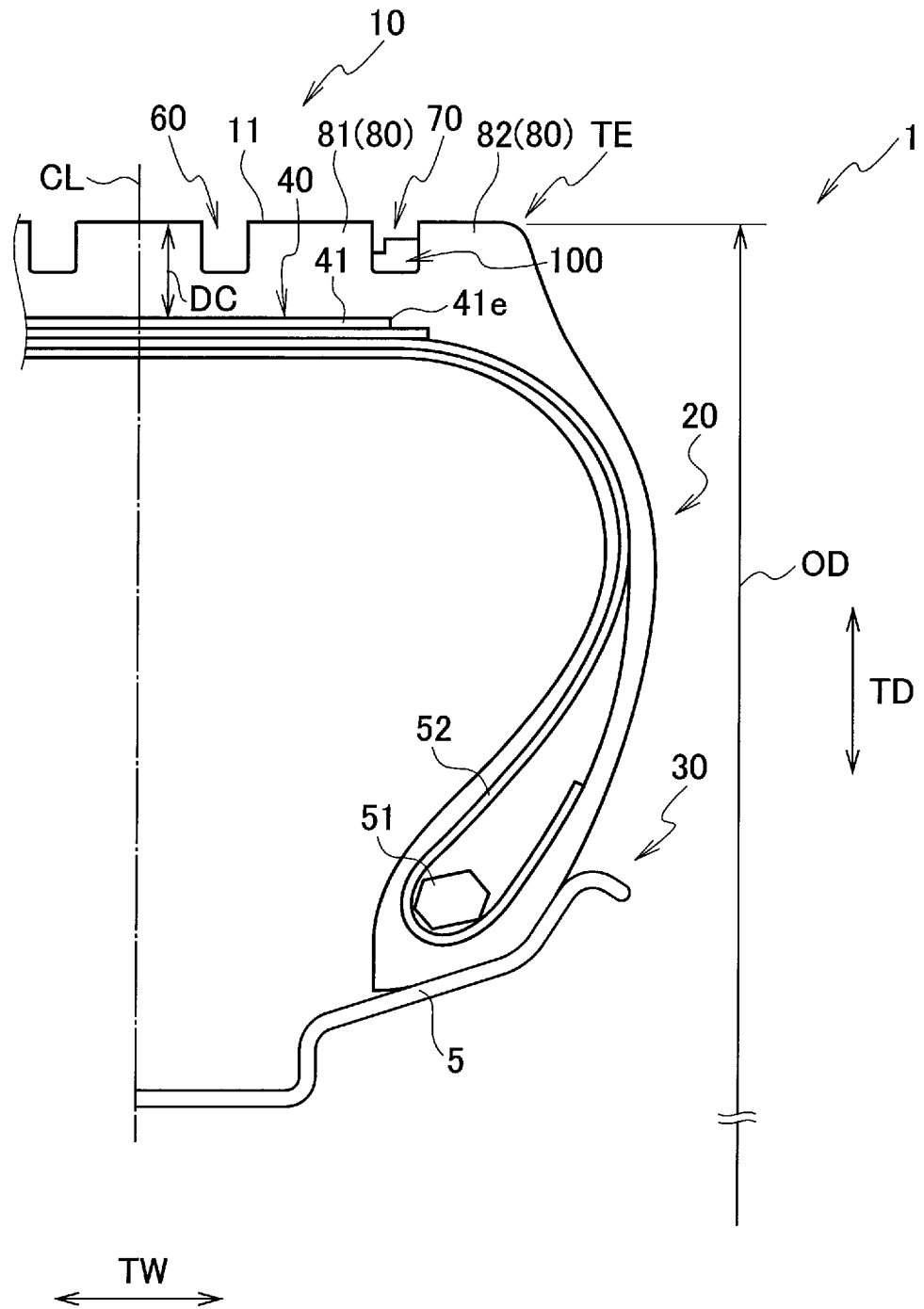
FIG. 2 is a cross-sectional view of the tire 1 taken along the tire width direction and the tire radial direction according to the first embodiment of the present invention.

FIG. 1 is a development view of a tread pattern of a tire 1 according to the embodiment. FIG. 2 is a cross-sectional view of the tire 1 according to the present embodiment along the tire width direction TW and the tire radial direction TD. The tire 1 according to the present embodiment has a shape that is asymmetrical with respect to the tire equator line CL as a reference. The tire 1 may have a symmetrical shape.

The tire 1 according to the present embodiment is assumed to be a pneumatic tire that is filled with air after being assembled to a normal rim 5. The gas with which the tire 1 that is assembled to the normal rim 5 is filled is not limited to air, and may be an inert gas such as nitrogen gas. Further, a cooling liquid (coolant) may be filled.

The tire 1 is preferably used for a heavy duty tire (TBR tire) mounted on a truck or bus (TB). The rubber gauge (rubber thickness) of a tread portion 10 of the tire 1 is thicker than that of a pneumatic tire mounted on a passenger car or the like. Specifically, the tire 1 satisfies DC/OD≥0.005 where the outer diameter of the tire is defined as OD and the rubber gauge of the tread portion 10 at the position of the tire equator line CL is DC.

Here, the tire outer diameter OD (unit: mm) is a diameter of the tire 1 in a portion where the outer diameter of the tire 1 is maximum (generally the tread portion 10 in the vicinity of the tire equator line CL). A rubber gauge DC (unit: mm) is a rubber thickness of the tread portion 10 at the position of the tire equator line CL. The rubber gauge DC does not include the thickness of a belt layer 40. In the case where the groove portion is formed at the position including the tire equator line CL, the rubber gauge DC is a rubber thickness of the tread portion 10 at the position adjacent to the groove portion.

As shown in FIG. 2, the tire 1 includes a tread portion 10 in contact with the road surface, a sidewall portion 20 connected to the tread portion 10 and positioned toward the inner side in the tire radial direction TD relative to the tread portion 10, and a bead portion 30 connected to the sidewall portion 20 and positioned toward the inner side in the tire radial direction TD relative to the sidewall portion 20.

The tread portion 10 has a tread grounding face 11 that contacts the road surface when the tire rolls. In the tread portion 10, a groove portion extending in the tire circumferential direction TC is formed.

In addition, as shown in FIG. 1, in the present embodiment, the tread portion 10 includes, as a groove portion, a groove portion 60 provided toward the inner side in the tire width direction TW, which is the tire equator line CL side, and a groove portion 70 provided toward the outer side in the tire width direction TW, which is a tread end TE side of the tread grounding face 11.

Here, in the tire 1 according to the present embodiment, the term "tread end TE" refers to the tire widthwise most outer position of the tread grounding face where the tire surface is in contact with the road surface (ground) in a state where the tire 1 is fitted on the normal rim 5 and inflated with a regular internal pressure, and the regular load is applied to the tire.

In addition, the term "regular rim" refers to a standard rim as specified in the following standard according to the size of the tire, the term "regular internal pressure" refers to an air pressure corresponding to the maximum load capacity of a single wheel in the applicable size, which is described in the following standards, and the term "regular load" refers to the maximum load (maximum load capacity) of a single wheel in the applicable size of the following standards. The standard is an industrial standard that is effective in the area where the tire is produced or used, for example, "JATMA YEAR BOOK" of "Japan Automobile Tyre Manufacturers Association" in Japan, "YEAR BOOK" of "THE TIRE AND RIM ASSOCIATION INC." in the United States, and "STANDARD MANUAL" of "The European Tyre and Rim Technical Organisation" in Europe.

Figure 4:
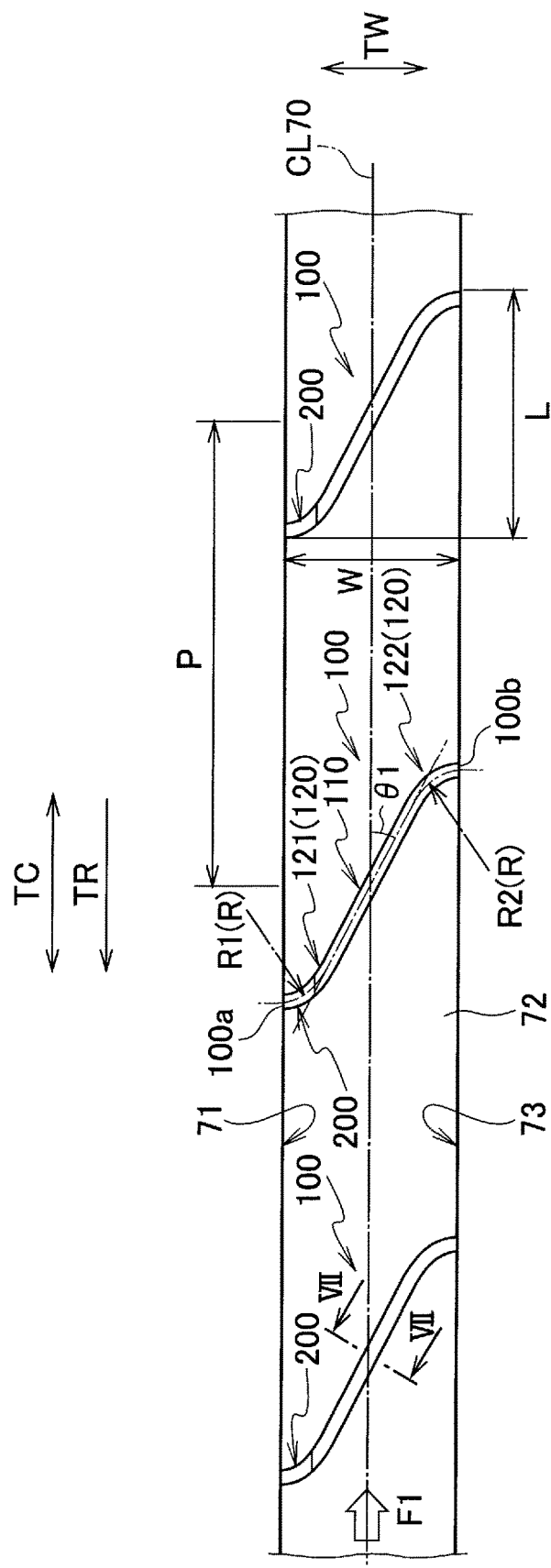
FIG. 4 is a plan view showing a shape of a groove portion in a tread surface view according to the first embodiment of the present invention.

The groove portion 70 includes a first groove wall 71 positioned toward the inner side in the tire width direction TW, a second groove wall 73 facing the first groove wall 71 in the tire width direction TW, and a groove bottom 72 connected to the first groove wall 71 and the second groove wall 73 (See FIG. 4).

The groove bottom 72 of the groove portion 70 is provided with a protrusion 100 extending in a direction intersecting the tire circumferential direction TC. The protrusion 100 may be provided in the groove portion 60 on the inner side in the tire width direction TW. It is preferable that the protrusion 100 be provided in at least the groove portion 70, which is closest to the end of the belt layer 40 in the tire width direction TW described later.

This is due to the following reason. That is, since the temperature of the end of the belt layer 40 in the tire width direction TW tends to rise due to rolling of the tire 1, in order to effectively suppress the temperature rise by the protrusion 100 formed in the groove portion, it is preferable to provide the protrusion 100 in at least the groove portion 70 closest to the end of the belt layer 40. The detailed structure of the protrusion 100 will be described later.

As shown in FIG. 1, a plurality of short sipes 400 extending along the tire width direction TW are formed at the edge portion of the first groove wall 71 and a second groove wall 73 on a tread surface 11 side. As in the present embodiment, the sipes 400 may be formed at predetermined intervals in the tire circumferential direction TC. It should be noted that the sipe is a groove designed to have a groove width of 1 mm or less so as to close at the time of grounding of the tire 1.

The sipe 400 opens into the groove portion 70 in the tire width direction and terminates in the land portions 81 and 82. The inner end of the sipe 400 in the tire radial direction is terminated at a position which is equal to or higher than the height H100 of the protrusion 100 in the tire radial direction to be described later, that is, at a position toward an outer side in the tire radial direction. In addition, in the present embodiment, the depth of the sipe 400 in the tire radial direction is formed to be in the range of 3.5 mm or more and 10 mm or less.

Figure 3:
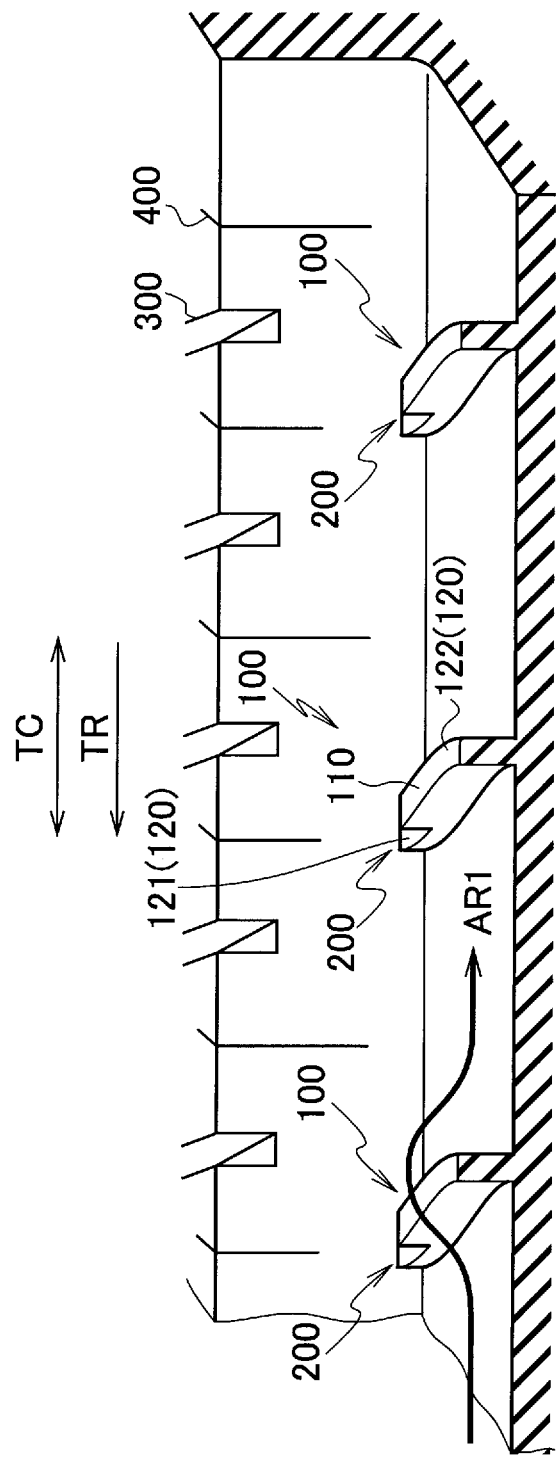
FIG. 3 is a partially broken perspective view of a groove portion according to a first embodiment of the present invention.

Further, as shown in FIG. 3, a position connecting a first end 100*a* of the protrusion 100 (described later) and a first groove wall in the tire circumferential direction, or the inner end of the sipe 400 in the tire radial direction formed at a position connecting a second end and a second groove wall may be formed so as to be positioned toward the outer side in the tire radial direction relative to the inner end of another sipe 400 in the tire radial direction.

The groove portion 70 is formed in the tread portion 10, whereby a plurality of land portions 80 are partitioned and formed. Specifically, in the groove portion 70, a first land portion 81 is formed inside the tire width direction TW and a second land portion 82 is formed outside the tire width direction TW. In the present embodiment, the first land portion 81 and the second land portion 82 are appropriately simply described as a land portion 80.

The first land portion 81 is provided with a shallow groove 300 having a shallower groove depth than a groove portion 70 in the tire radial direction TD, extending at an angle with respect to the tire width direction TW, and being open to the groove portion 70. The shallow groove 300 has a shallower depth in the tire radial direction TD than the sipe 400. In addition, in the present embodiment, the depth of the shallow groove 300 in the tire radial direction is in the range of 1 mm or more and less than 3.5 mm, and the groove width is formed to be 2 to 5 mm. It is preferable that the angle between the extending direction of the shallow groove 300 and the tire circumferential direction TC be within the range of 10 to 60 degrees.

A belt layer 40 constituted by a plurality of belts 41 is provided on the inner side of the tread portion 10 in the tire radial direction TD. A groove portion 70 formed in the tread portion 10 is arranged outside an end 41*e* of the belt 41 in the tire radial direction TD.

Further, a carcass layer 52 that strides over a pair of right and left bead cores 51 and forms a skeleton of the tire 1 is provided inside the belt layer 40 in the tire radial direction TD. The end of the carcass layer 52 is folded so as to wrap a bead core 51.

(2) Structure of Protrusion

Figure 5:
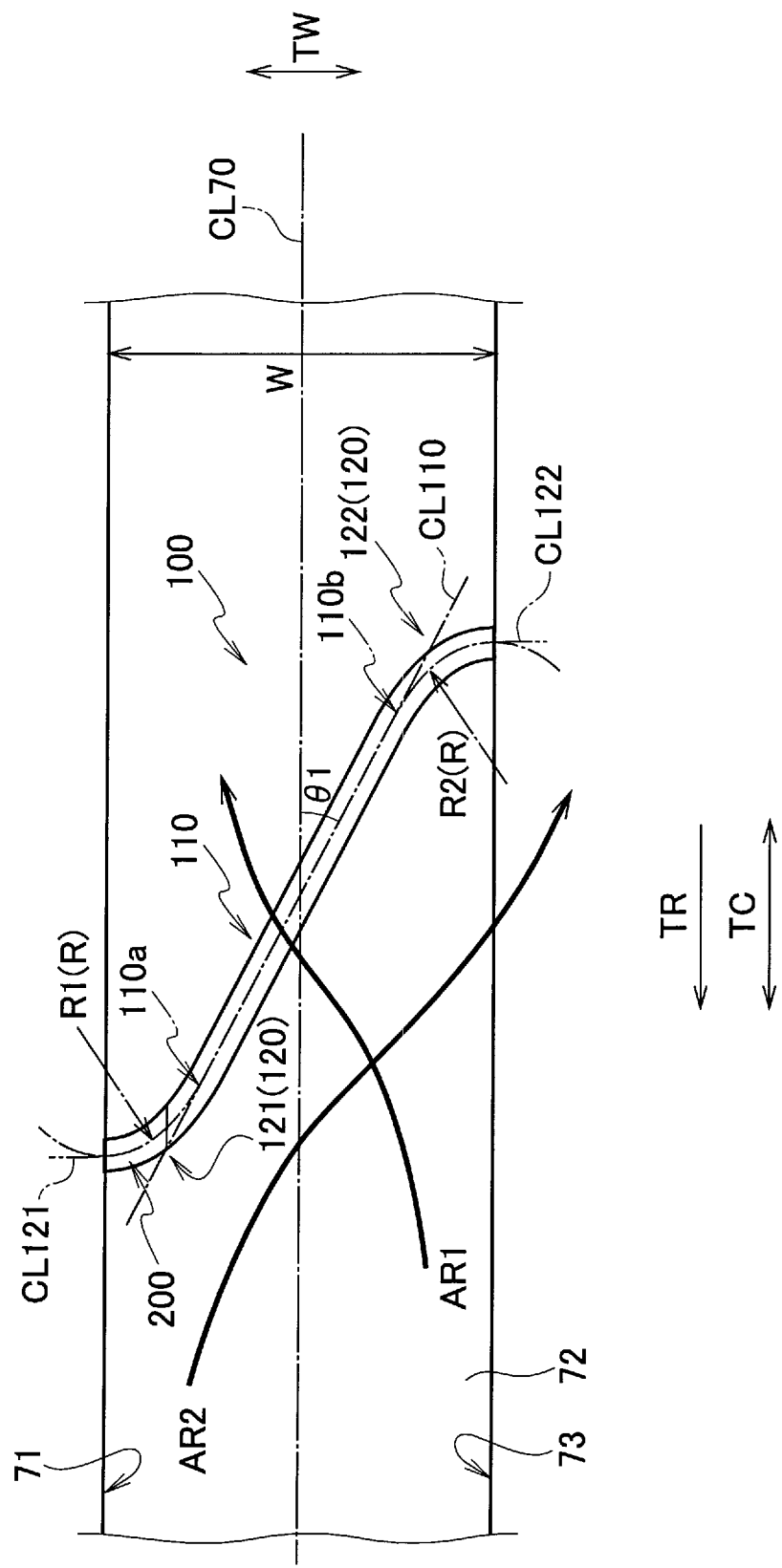
FIG. 5 is an enlarged plan view of a protrusion according to the first embodiment of the present invention.
Figure 6:
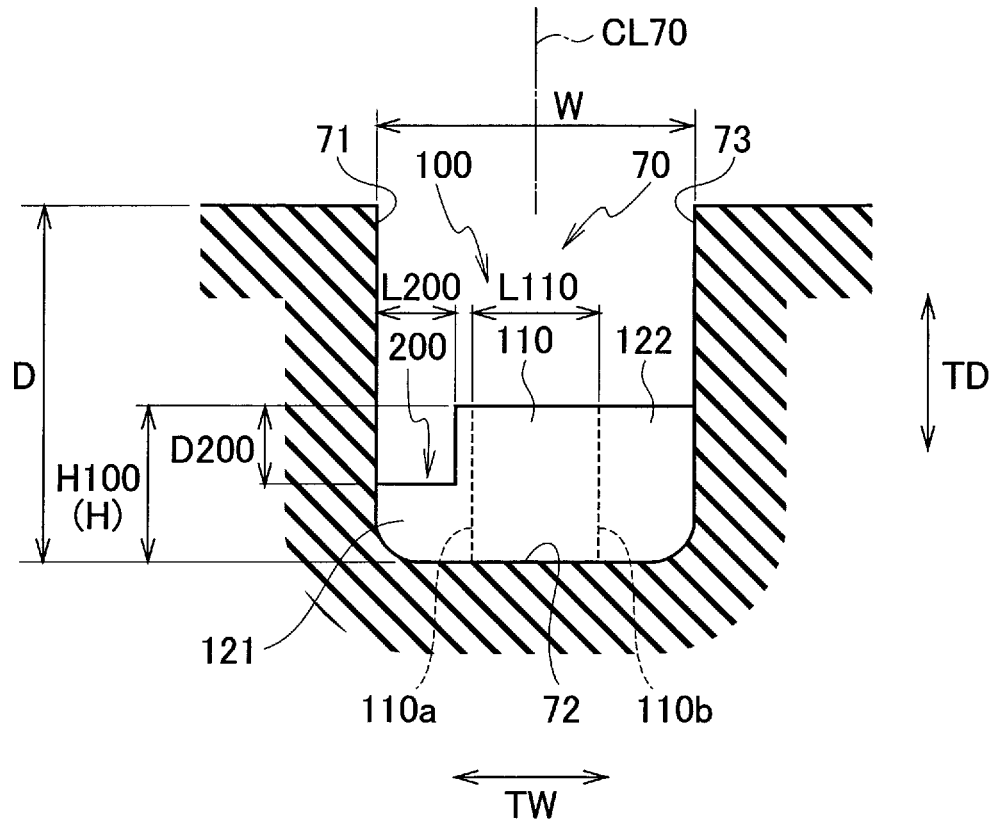
FIG. 6 is a cross-sectional view of the groove portion taken along the tire width direction and the tire radial direction when viewed from the F1 direction in FIG. 4.
Figure 7:
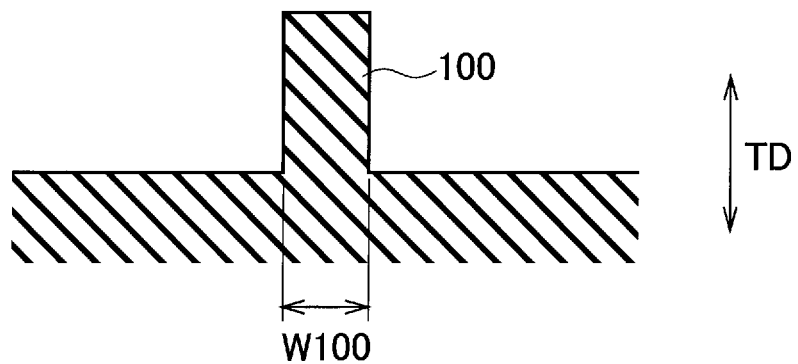
FIG. 7 is a cross-sectional view of a protrusion along line VII-VII and the tire radial direction in FIG. 4.

Next, the configuration of the protrusion 100 will be described with reference to the drawings. FIG. 3 is a partially broken perspective view of the groove portion according to the first embodiment of the present invention. FIG. 4 is a plan view showing a shape of the groove portion in a tread surface view according to the first embodiment of the present invention. FIG. 5 is an enlarged plan view of a protrusion according to the first embodiment of the present invention. FIG. 6 is a cross-sectional view of the groove portion taken along the tire width direction and the tire radial direction when viewed from the F1 direction in FIG. 4. FIG. 7 is a cross-sectional view of the protrusion along line VII-VII and the tire radial direction in FIG. 4.

As shown in FIGS. 3 to 4, in the present embodiment, for the convenience of explanation, when mounting the tire 1 on the vehicle, the present embodiment defines the rotation direction TR in which the tire 1 rotates due to forward movement of the vehicle. The rotation direction TR when the tire 1 is mounted on the vehicle is not particularly specified.

As shown in FIGS. 3 to 4, a plurality of protrusions 100 is provided in the groove portion 70. The protrusions 100 are provided at a predetermined interval P in the tire circumferential direction TC.

Further, as shown in FIG. 4, when in the tread surface view of the tire 1 the length of the protrusion 100 along a groove centerline CL70 passing through the center of the groove portion 70 is defined as L, and the predetermined interval of the protrusions 100 in the tire circumferential direction TC is defined as P, it is preferable that the predetermined interval P be 0.75 times or more and 10 times or less the length L. That is, it is preferable that the predetermined interval P and the length L satisfy the relation of $0.75L \leq P \leq 10L$.

The groove centerline CL70 is an imaginary line passing through the center in the groove width direction orthogonal to the extending direction of the groove portion 70, and in the present embodiment, it is parallel to the tire circumferential direction TC. In addition, the length L is the length from one end to the other end of the protrusion 100 along the groove centerline CL70. The distance P is a distance between two adjacent protrusions 100 and is the distance between the centers of the protrusions 100 where the protrusion 100 and the groove centerline CL70 intersect.

In the present embodiment, the protrusion 100 is continuous from the first groove wall 71 forming the groove portion 70 to the second groove wall 73 forming the groove portion 70. Specifically, the first end 100*a* of the protrusion 100 is connected to the first groove wall 71, and a second end 100*b* of the protrusion 100 is connected to the second groove wall 73.

In the present embodiment, the first groove wall 71 is formed at the first land portion 81 on the inner side of the groove portion 70 in the tire width direction TW, and the second groove wall 73 is formed at the second land portion 82 on the outer side of the groove portion 70 in the tire width direction TW.

In addition, in the present embodiment, a position connecting the first end 100*a* of the protrusion 100 and the first groove wall 71 and a position where the shallow groove 300 is open to the first groove wall 71 are formed to be different in the tire circumferential direction TC.

In addition, a slit 200 is formed on the protrusion 100 so as to traverse the protrusion 100. The slit 200 is formed in at least one of the first end 100*a* of the protrusion 100A connected to the first groove wall 71 and the second end 100*b* of a protrusion 100A connected to the second groove wall 73. The slit 200 is formed in a concave shape recessed inward in the tire radial direction TD. The bottom surface of a slit 200 does not reach the groove bottom 72 of the groove portion 70, and is positioned toward the outer side in the tire radial direction TD relative to the groove bottom 72 of the groove portion 70. Therefore, when the slit 200 is formed at the first end 100*a* of the protrusion 100, the protrusion 100 and the first groove wall 71 are connected to each other at the bottom surface of the slit 200.

In the present embodiment, the case where the slit 200 is formed at the first end 100a of the protrusion 100 connected to the first groove wall 71 will be described as an example. The detailed configuration of the slit 200 will be described later (see FIG. 6).

Further, as shown in FIG. 5, in the tread surface view of the tire 1, the protrusion 100 includes a linear portion 110 and at least one curved portion 120.

The linear portion 110 linearly extends in a direction inclined with respect to the tire circumferential direction TC at the center of the groove portion 70. Here, the center of the groove portion 70 indicates the groove centerline CL70 passing through the center in the groove width direction of the groove portion 70. In other words, a centerline CL110 of the linear portion 110 is arranged so as to intersect with the groove centerline CL70.

The curved portion 120 continues to the linear portion 110 and is curved toward the tire circumferential direction TC. In addition, the protrusion 100 is provided with a plurality of curved portions 120.

Specifically, the protrusion 100 includes, as the curved portion 120, a first curved portion 121 curved toward one of the tire circumferential direction TC and a second curved portion 122 toward the other of the tire circumferential direction TC.

The first curved portion 121 is connected to one end 110a of the linear portion 110 and the first groove wall 71. The second curved portion 122 is connected to the other end 110b of the linear portion 110 and the second groove wall 73. In the following description, the first curved portion 121 and the second curved portion 122 will be described simply as the curved portion 120.

Further, in the case where the width of the groove portion 70 is defined as the groove width W, it is preferable that the curvature radius R of the curved portion 120 be within the range of 3 times or more and 10 times or less the groove width W in the tread surface view of the tire 1. Specifically, it is preferable that both the curvature radius R1 of the first curved portion 121 and the curvature radius R2 of the second curved portion 122 be 3 times or more and 10 times or less the groove width W, and $3W \leq R1$ (and $R2) \leq 10W$ be satisfied.

The groove width W is the width of the groove portion 70 in the groove width direction orthogonal to the extending direction of the groove portion 70. In the present embodiment, since the extending direction of the groove portion 70 is the tire circumferential direction TC, the groove width W is the width of the groove portion 70 in the tire width direction TW orthogonal to the tire circumferential direction TC.

In the present embodiment, the curvature radius R1 of the first curved portion 121 and the curvature radius R2 of the second curved portion 122 are the same. However, the curvature radius R1 of the first curved portion 121 and the curvature radius R2 of the second curved portion 122 are not necessarily the same. That is, each curvature radius of the plurality of curved portions 120 may be different. For example, when the deformation amount of the first groove wall 71 is larger than that of the second groove wall 73, the curvature radius R1 of the first curved portion 121 and the curvature radius R2 of the second curved portion 122 satisfy the relation of R2>R1.

Further, in the present embodiment, it is preferable that an angle θ1 between the extending direction of the linear portion 110 and the tire circumferential direction TC be within the range of 10 to 60 degrees. Specifically, it is preferable that the angle θ1 between the centerline CL110 along the extending direction of the linear portion 110 and the groove centerline CL70 along the tire circumferential direction TC be within the range of 10 to 60 degrees. In addition, the direction of the inclination with respect to the tire circumferential direction TC is identical to the direction in which the shallow groove 300 is inclined. The inclination angles between the linear portion 110 and the shallow groove 300 may be different from each other as shown in FIG. 1, or may be the same angle.

Further, as shown in FIG. 6, in the tire width direction TW, it is preferable that the length L110 of the linear portion 110 be 40% or more and 90% or less of the groove width W.

In addition, when the height of the protrusion 100 from the groove bottom 72 is defined as H, and the height of the tread grounding face 11 from the groove bottom 72, that is, the depth of the groove portion 70 from the tread grounding face 11 to the groove bottom 72 (deepest portion) is defined as D, it is preferable that the height H be more than 0.03 times and 0.4 times or less of the depth D. That is, it is preferable that the height H and the depth D satisfy the relation of $0.03D<H \leq 0.4D$.

In addition, the depth D200 of the slit 200 along the tire radial direction TD is smaller than the height H100 of the protrusion 100. The depth D200 of the slit 200 is preferably 19% to 90% of the height H100 of the protrusion 100. When the depth D200 of the slit 200 is 19% or more of the height H100 of the protrusion 100, the effect of suppressing the distortion occurring to the protrusion 100 can be reliably obtained. On the other hand, when the depth D200 of the slit 200 is 90% or less of the height H100 of the protrusion 100, the effect of increasing the thermal conductivity of the groove bottom 72 by the turbulent flow can be reliably obtained.

In the case where the width of the groove portion 70 is defined as the groove width W, it is preferable that the length L200 of the slit 200 in the tire width direction TW be 4% to 20% of the groove width W. When the length L200 of the slit 200 is 4% or more of the groove width W, the effect of suppressing the distortion occurring to the protrusion 100 can be reliably obtained. On the other hand, when the length L200 of the slit 200 is 20% or less of the groove width W, the effect of increasing the thermal conductivity of the groove bottom 72 by the turbulent flow can be reliably obtained.

Further, as shown in FIG. 7, in this embodiment, it is preferable that the width W100 of the protrusion 100 be 1 mm or more and 4 mm or less. The width W100 of the protrusion 100 is a length in the direction orthogonal to the centerline of the protrusion 100. For example, the width W100 of the protrusion 100 may be the length in the direction orthogonal to the centerline CL110 of the linear portion 110 of the protrusion 100.

In the present embodiment, the protrusion 100 has the same width W100 in the linear portion 110, the first curved portion 121, and the second curved portion 122. However, the width of the linear portion 110, the width of the first curved portion 121, and the width of the second curved portion 122 are not necessarily the same. For example, when the deformation amount of the first groove wall 71 is larger than that of the second groove wall 73, the width of the first curved portion 121 extending from the first groove wall 71 is larger than the width of the linear portion 110 or the width of the second curved portion 122.

(3) Effects

In the tire 1 according to the present embodiment, since the protrusion 100 is formed at the groove bottom 72 of the groove portion 70 extending in the tire circumferential direction TC, due to the rotation of the tire 1, the air flows AR1 and AR2 (relative wind) in the direction opposite to the rotation direction TR are generated in the groove portion 70 (see FIG. 5).

Specifically, the flow AR1 of part of the air along the second groove wall 73 of the groove portion 70 goes over the protrusion 100 without moving along the groove portion 70 because the protrusion 100 is positioned in the traveling direction. At this time, the air flow AR1 changes into a spiral (swirl-like) flow. In addition, since the air flow AR1 involves surrounding air, the flow rate of the air increases and the speed of the air flow AR1 increases. As a result, heat radiation from the tread portion 10 is promoted.

In addition, part of the air flow AR2 along the first groove wall 71 of the groove portion 70 moves along the extending direction of the protrusion 100. Thereafter, the air flow AR2 flows out to the outside of the groove portion 70 toward the second groove wall 73 of the groove portion 70. As a result, air that has accumulated heat by passing through the inside of the groove portion 70 flows to the outside, so that heat radiation from the tread portion 10 is promoted.

Further, in the tire 1 according to the present embodiment, the protrusion 100 includes a linear portion 110 extending linearly and the curved portion 120 curved in the tire width direction TW (the first curved portion 121 and the second curved portion 122).

Here, as in the prior art, in the case where the protrusion constituted only by the linear portion receives compressive force from the land portions 80 on both sides, since the distortion (deformation) caused by the compressive force concentrates at the central portion of the protrusion in the tire width direction (in the vicinity of the groove centerline CL70), cracks are generated.

On the other hand, in the tire 1 according to the present embodiment, when the protrusion 100 receives compressive force from the land portions 80 on both sides due to deformation of the land portions 80 on both sides of the groove portion 70 at the time of tire rolling, the curved portion 120 deforms so as to bend. That is, the curved portion 120 can distribute the compressive force without concentrating it on the central portion of the protrusion 100. Accordingly, it is possible to prevent distortion (deformation) caused by compressive force received from the land portions 80 on both sides from locally concentrating on the central portion of the protrusion 100.

Furthermore, when the protrusion 100 receives a tensile force from the land portions 80 on both sides, the curved portion 120 can be deformed so as to stretch, so that it is possible to prevent distortion (deformation) caused by the tensile force from locally concentrating on the central portion of the protrusion 100.

As in the prior art, when the protrusion constituted only by the linear portion receives compressive force from the land portions 80 on both sides, distortion (deformation) occurs to the protrusion, and as a result, part of the protrusion 100 may be distorted like the curved portion 120. In other words, the protrusion 100 according to the present embodiment is configured in advance to have a protrusion in a distorted state under the compression force, so that it can also be said that the configuration prevents distortion from locally concentrating on the central portion of the protrusion 100.

In particular, in the tire 1 according to the present embodiment, the slit 200 is formed at the first end 100a of the protrusion 100. Thus, even if the land portion 80 constituting the first groove wall 71 is deformed, since the deformed portion of the land portion 80 is absorbed by the slit 200, the compressive force received by the protrusion 100 from the land portion 80 can be suppressed. As a result, distortion occurring to the protrusion 100 can be suppressed.

In this manner, in the tire 1 according to the present embodiment, it is possible to suppress cracks from occurring to the protrusion 100 by suppressing and dispersing the distortion occurring to the protrusion 100, so that it is possible to surely generate the intended turbulent flow due to the protrusion 100. Further, since the protrusion 100 has the linear portion 110, it is possible to reliably generate the intended turbulent flow comparing with the case where the protrusion 100 is constituted only by the curved portion 120, so that temperature rise can be more reliably suppressed. That is, in the present embodiment, it is possible to improve durability of the protrusion 100 by suppressing cracks from occurring to the protrusion 100, while reliably suppress the temperature rise of the tread portion 10.

Note that it is preferable that the slit 200 be formed at the first end 100a of the protrusion 100 positioned toward the inner side in the tire width direction TW of the first end 100a and the second end 100b of the protrusion 100A. This is due to the following reason. That is, since the first land portion 81 toward the inner side of the groove portion 70 in the tire width direction TW is closer to the tire equator line CL than the second land portion 82 toward the outer side of the groove portion 70 in the tire width direction TW, the first land portion 81 receives a high ground contact pressure, and has a larger amount of deformation. Therefore, by forming the slit 200 at the first end 100a of the protrusion 100 positioned toward the inner side in the tire width direction TW, the slit 200 reliably absorbs the deformed portion of the first land portion 81 inside the tire width direction TW, and the compression force received by the protrusion 100 from the land portion 80 can be surely suppressed. As a result, it is possible to more reliably suppress the distortion occurring to the protrusion 100.

In addition, from the viewpoint of reliably absorbing by the curved portion 120 the compressive force received from the land portions 80 on both sides, it is preferable to arrange the protrusion 100 such that the curved portion 120 is connected to the land portions 80 on both sides. That is, it is preferable that the curved portion 120 be arranged between one end 110a of the linear portion 110 and the first groove wall 71 and between the other end 110b of the linear portion 110 and the second groove wall 73.

Further, in the tire 1 according to the present embodiment, the protrusion 100 is continuous from the first groove wall 71 forming the groove portion 70 to the second groove wall 73 forming the groove portion 70. As a result, the air flowing through the groove portion 70 reliably collides with the protrusion 100, so that it is possible to reliably generate the turbulent flow by the protrusion 100.

In addition, in the tire 1 according to the present embodiment, the first land portion 81 has the shallow groove 300, the shallow groove 300 having a groove depth shallower than the groove portion 70 in the tire radial direction TD, extending at an angle with respect to the tire width direction TW, and opening to the groove portion 70. For this reason, a flow of air (relative wind) in the direction opposite to the rotation direction TR occurs in the shallow groove 300 due to the rotation of the tire 1, and heat radiation of the tread portion 10 is promoted in the initial stage of wear when the tire 1 has a thick rubber gauge DC and a large volume of rubber. In addition, when the shallow groove 300 is formed shallower than the sipe 400, it is possible to suppress an increase in compression deformation due to a decrease in rigidity of the land portion 80 and a rise in temperature of the tread portion caused by the increase in compression deformation.

Furthermore, in the tire 1 according to the present embodiment, the direction of inclination with respect to the tire circumferential direction TC is identical to the direction in which the shallow groove 300 is inclined. Since the protrusion 100 is inclined in an identical direction as the first land portion 81 inside the tire width direction TW in which the deformation amount is increased by receiving the high ground contact pressure, it is possible to prevent distortion from locally concentrating on the central portion of the protrusion 100.

In the tire 1 according to the present embodiment, a position connecting the first end 100a of the protrusion 100 and the first groove wall 71 and a position where the shallow groove 300 is open to the first groove wall 71 are formed to be different in the tire circumferential direction TC. Therefore, even when the bulging deformation increases at a position of the first land portion 81 in the tire circumferential direction where the shallow groove 300 is formed, it is possible to suppress cracks from occurring to the protrusion.

In addition, in the tire 1 according to the present embodiment, it is preferable that the angle θ1 formed between the centerline CL110 along the extending direction of the linear portion 110 and the tire circumferential direction TC be within the range of 10 to 60 degrees.

Figure 8:
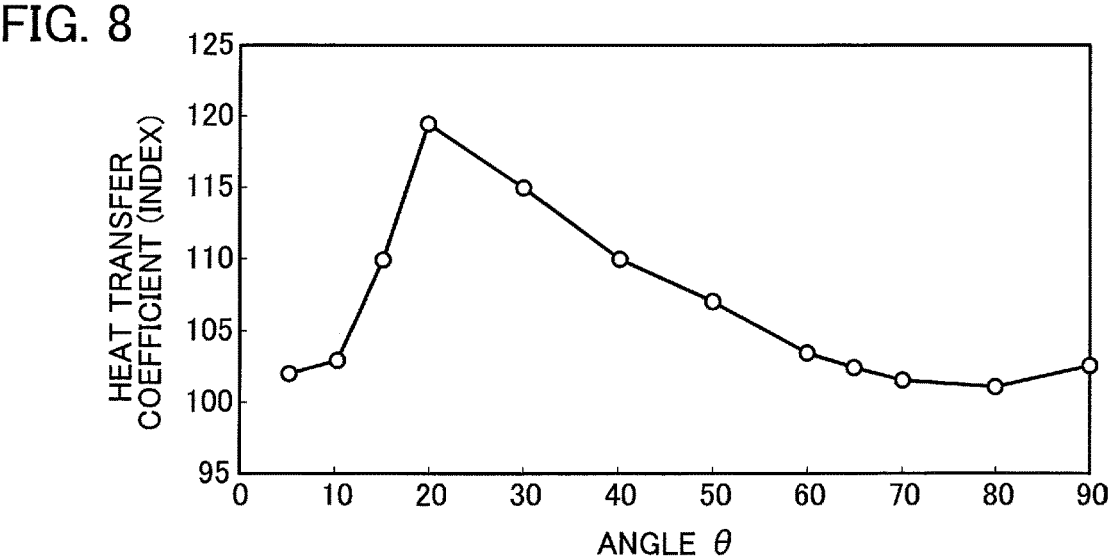
FIG. 8 is a graph chart showing measurement results obtained by measuring a relation between the angle in the extending direction of the linear portion with respect to the tire circumferential direction and the heat transfer coefficient (index display) of the groove portion.

Here, FIG. 8 is a graph showing the measurement result obtained by measuring the relation between the angle of the linear portion 110 with respect to the tire circumferential direction TC and the heat transfer coefficient (index display) in the groove portion 70. In the graph in FIG. 8, the value 100 of the heat transfer coefficient indicates the heat transfer coefficient (reference value) of the tire without the protrusion 100.

As shown in FIG. 8, since the angle θ1 is 10 degrees or more, it is possible to suppress the flows AR1 and AR2 of the air flowing along the linear portion 110 of the protrusion 100 from weakening. In addition, since the protrusion 100 can be easily manufactured in the groove portion 70, the convenience in manufacturing is enhanced.

On the other hand, since the angle θ1 is equal to or less than 60 degrees, it is possible to efficiently change the flow AR2 of air flowing through the groove portion 70 into a spiral flow. Therefore, the amount of air passing through the groove bottom 72 increases, and heat can be dissipated efficiently from the tread portion 10.

It is more preferable that the angle θ1 be 15 degrees or more and 40 degrees or less. As a result, as shown in FIG. 8, it is possible to exceed the value 103 of the heat transfer coefficient that certainly exerts its effect at the time of mounting, so that the effect of suppressing the temperature rise of the tread portion 10 is reliably enhanced.

In addition, in the tire 1 according to the present embodiment, when the length of the protrusion 100 along the groove center line CL70 passing through the center of the groove portion 70 in the tread surface view of the tire 1 is defined as L, and the length of the protrusion 100 in the tire circumferential direction TC is defined as P, it is preferable that the relation of 0.75L≤P≤10L be satisfied.

Figure 9:
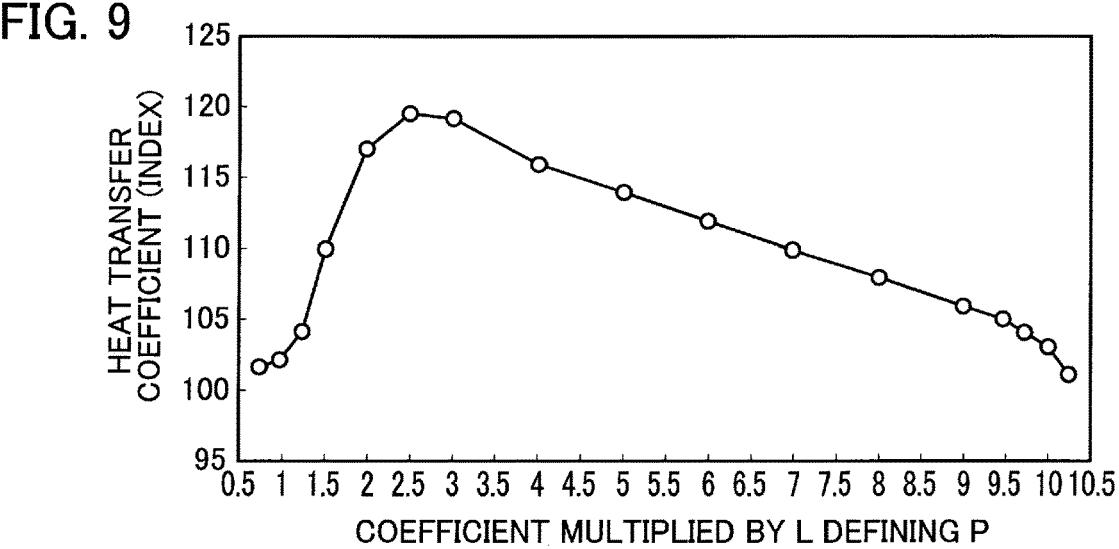
FIG. 9 is a graph showing a measurement result obtained by measuring a relation between a coefficient multiplied by the length L of a protrusion defining a predetermined interval P and a heat transfer coefficient of a groove portion.

Here, FIG. 9 is a graph showing the measurement result obtained by measuring the relation between the coefficient multiplied by the length L of the protrusion 100 that defines the predetermined interval P and the heat transfer coefficient in the groove portion 70. In the graph in FIG. 9, the value 100 of the heat transfer coefficient indicates the heat transfer coefficient (reference value) of the tire without the protrusion 100. In addition, the coefficient can also be expressed as the ratio P/L of the predetermined interval P to the length L.

As shown in FIG. 9, the protrusion 100 satisfies the relation of 0.75L≤P, so that the number of protrusions 100 provided in the groove portion 70 does not become too large, and it is possible to suppress the speed of the air flowing through the groove portion 70 from decreasing. By satisfying the relation of P≤10L, the number of the protrusions 100 provided in the groove portion 70 does not become too small, and the air flows AR1 and AR2 efficiently change into a spiral (swirl-like) flow.

In addition, it is also preferable that 1.25L<P be satisfied, more preferably 1.5L<P, and still more preferably 2.0L<P. Satisfying these relations provides the more appropriate number of the protrusions 100 provided in the groove portion 70. Further, since the area of the groove bottom 72 through which the air flows AR1 and AR2 pass is not too small, heat is efficiently dissipated from the groove bottom 72. As a result, as shown in FIG. 9, it is possible to exceed the value 103 of the heat transfer coefficient, which surely exerts its effect at the time of mounting, so that the effect of suppressing the temperature rise of the tread portion 10 is reliably enhanced.

In addition, in the tire 1 according to the present embodiment, when the height of the protrusion 100 from the groove bottom 72 is defined as H, and when the depth of the groove portion 70 from the tread grounding face 11 to the groove bottom 72 is defined as D, it is preferable that the relation of 0.03D<H≤0.4D be satisfied.

Figure 10:
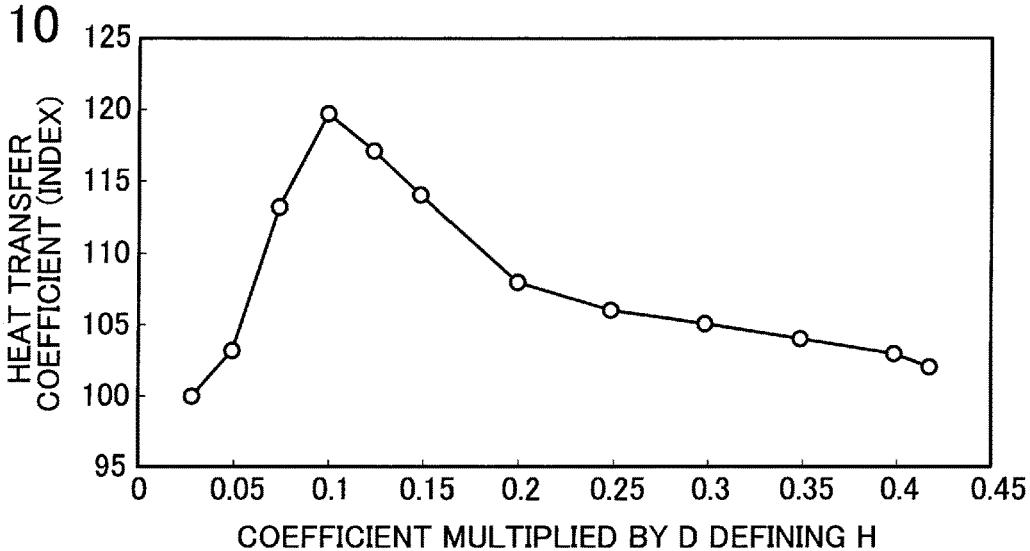
FIG. 10 is a graph showing the measurement result obtained by measuring a relation between a coefficient multiplied by a groove depth D that defines a height H and the heat transfer coefficient of the groove portion.

Here, FIG. 10 is a graph showing the measurement result obtained by measuring the relation between the coefficient multiplied by the groove depth D that defines the height H and the heat transfer coefficient in the groove portion 70. In the graph in FIG. 10, the value 100 of the heat transfer coefficient indicates the heat transfer coefficient (reference value) of the tire without the protrusion 100. In addition, the coefficient can also be expressed as the ratio H/D of the height H to the groove depth D.

As shown in FIG. 10, by satisfying the relation of 0.03D<H, the height H of the protrusion 100 is equal to or higher than the predetermined height, so that the flows AR1 and AR2 of the air flowing in the groove portion 70 can be made to change into a spiral flow efficiently. Therefore, the amount of air passing through the groove bottom 72 increases, and heat is efficiently radiated from the tread portion 10. By satisfying the relation H≤0.4D, the air flows AR1 and AR2 that has changed into the spiral flow easily reach the groove bottom 72, so that the heat is efficiently dissipated from the groove bottom 72.

Further, by satisfying the relation of 0.05D≤H and satisfying the relation of H≤0.35D, as shown in FIG. 10, it is possible to exceed the value 103 of the heat transfer coefficient, which surely exerts its effect during mounting, so that the effect of suppressing the temperature rise of the tread portion 10 is enhanced reliably.

In addition, in the tire 1 according to the present embodiment, when the width of the groove portion 70 is defined as the groove width W, it is preferable that the curvature radius R of the curved portion 120 in the tread surface view of the tire 1 be 3 times or more and 10 times or less the groove width W. Specifically, it is preferable that both the curvature radius R1 of the first curved portion 121 and the curvature radius R2 of the second curved portion 122 be 3 times or more and 10 times or less the groove width W.

Figure 11:
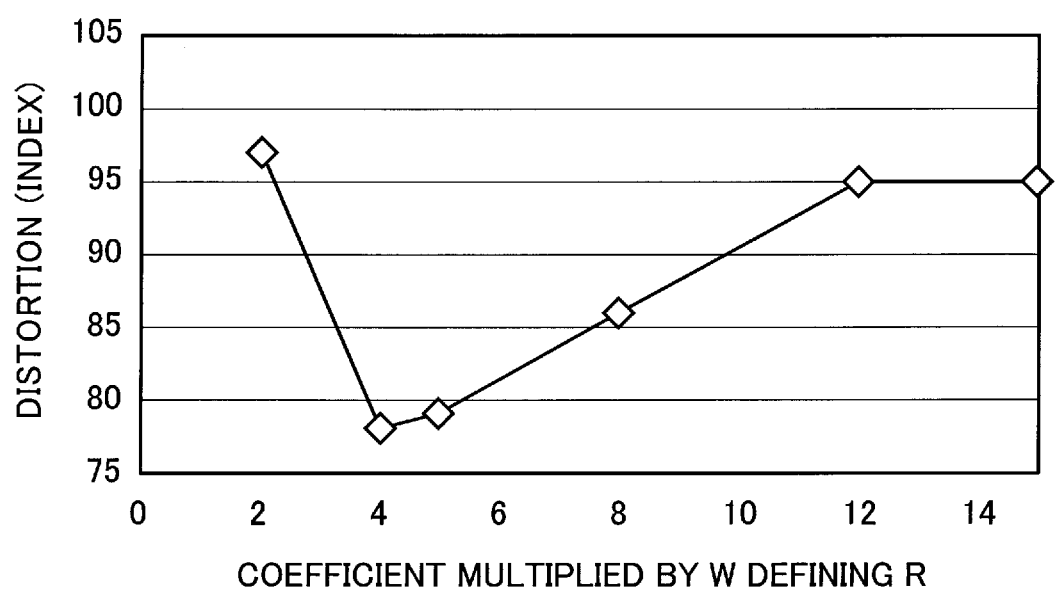
FIG. 11 is a graph showing measurement results obtained by measuring a relation between a coefficient multiplied by a groove width W defining a curvature radius R of a curved portion and a distortion.

Here, FIG. 11 is a graph chart showing measurement results obtained by measuring the relation between the curvature radius R and distortion. As shown in FIG. 11, since the curvature radius R of the curved portion 120 is 3 times or more the groove width W, even if the protrusion 100 receives compressive force, it is possible to suppress the distortion from concentrating at the center of the protrusion 100. On the other hand, since the curvature radius R of the curved portion 120 is equal to or less than 10 times the groove width W, it is possible to prevent the curved portion 120 from becoming a shape close to a straight line. As a result, the shear deformation due to the compressive force can be dispersed in the curved portion 120 (the first curved portion 121 and the second curved portion 122), so that it is possible to suppress cracks from occurring.

It is more preferable that the curvature radius R of the curved portion 120 be 3.5 times or more and 8 times or less the groove width W. Thus, it is possible to more reliably suppress cracks from occurring, while suppressing temperature rise.

Further, in the tire 1 according to the present embodiment, it is preferable that the width W100 of the protrusion 100 be 1 mm or more and 4 mm or less. Since the width W100 of the protrusion 100 is 1 mm or more, the rigidity of the protrusion itself for stably generating the turbulent flow can be maintained, so that it is possible to ensure the heat transfer coefficient by generating the turbulent flow, and temperature rise can be suppressed more reliably. In addition, it is possible to suppress molding defects such as mold chipping from occurring during tire manufacturing.

On the other hand, since the width W100 of the protrusion 100 is 4 mm or less, the groove bottom 72 other than the protrusion 100 can have a wider region area, so that the effect of cooling the groove bottom 72 by the air flows AR1 and AR2 can be enhanced.

In the tire 1 according to the present embodiment, a plurality of short sipes 400 extending along the tire width direction TW are formed at the edge portion of the first groove wall 71 and the second groove wall 73 on the tread surface 11 side.

The inner ends of the plurality of sipes 400 in the tire radial direction TD are located at a position identical to a height position H100 of the protrusion 100 or positioned toward the outer side in the tire radial direction TD. Therefore, it is possible to suppress the rigidity of the land portions 81 and 82 from lowering due to the formation of the sipe 400, and the compressive deformation generated when the tire is rolling on the road surface is reduced. As a result, it is possible to suppress cracks from occurring to the protrusion 100.

Further, in the tire 1 according to the present embodiment, the inner end of a sipe 400 in the tire radial direction formed at a position connecting the first end 100a and the first groove wall 71, or a position connecting the second end 100b and the second groove wall 73 in the tire circumferential direction TC, may be located toward the outer side in the tire radial direction TD relative to the inner end of another sipe 400 of the plurality of sipes 400 in the tire radial direction TD. In this case, since the influence of the reduction in the rigidity of the land portions 81 and 82 due to the formation of the sipe 400 is further reduced, it is possible to further suppress cracks from occurring to the protrusion 100.

[First Variation]

Next, the tire 1 according to the first variation of the first embodiment will be described. The tire 1 according to the present embodiment is different from the tire 1 according to the above-described first embodiment in the configuration of the protrusion. Therefore, in the following description, focusing on the configuration of the protrusion description will be made.

Figure 12:
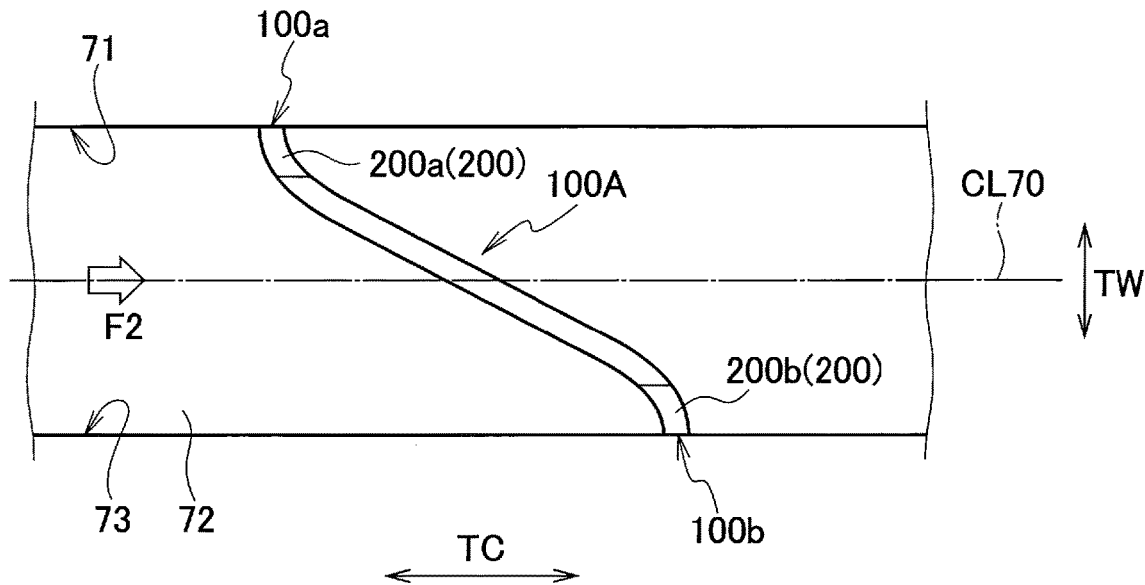
FIG. 12 is an enlarged plan view of a protrusion according to a first variation of the first embodiment.
Figure 13:
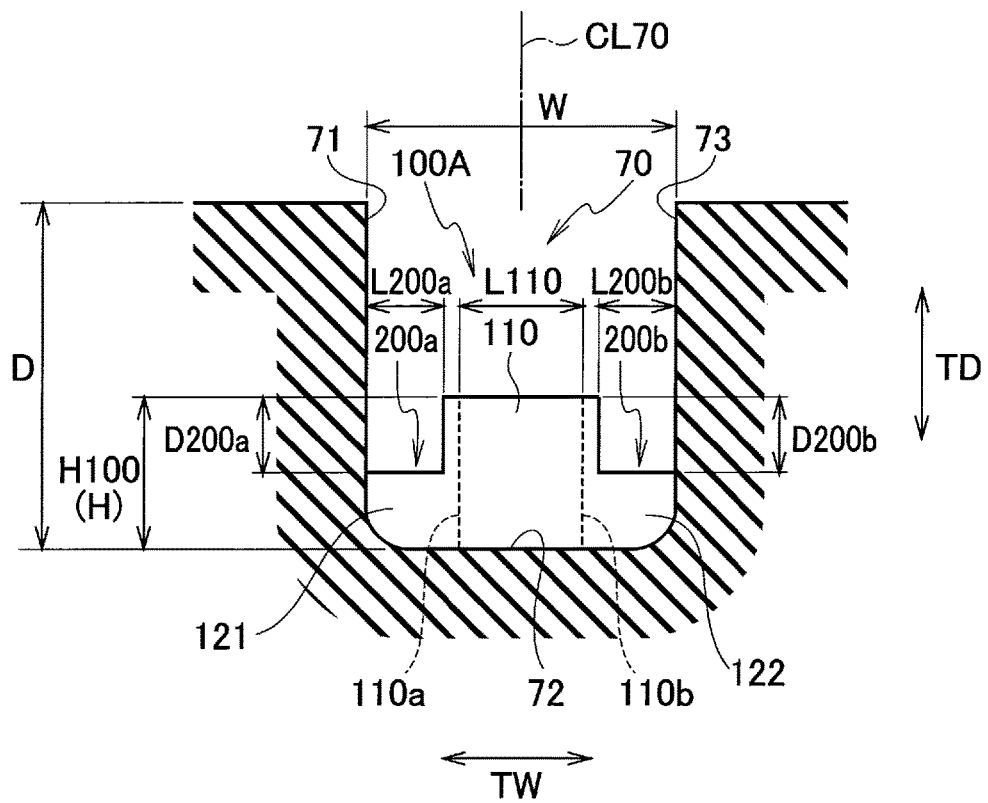
FIG. 13 is a cross-sectional view of the groove portion taken along the tire width direction and the tire radial direction when viewed from the F2 direction in FIG. 12.

Here, FIG. 12 is an enlarged plan view of the protrusion 100A according to the first variation of the first embodiment. FIG. 13 is a cross-sectional view of the groove portion 70 taken along the tire width direction TW and the tire radial direction TD when viewed from the F2 direction in FIG. 12.

In the protrusion 100A according to the present embodiment, the slit 200 is formed on a first end 100a of the protrusion 100A connected to the first groove wall 71 and the second end 100b of the protrusion 100A connected to the second groove wall 73. Specifically, the slit 200a is formed in the first end 100a of the protrusion 100A, and the slit 200b is formed in the second end 100b of the protrusion 100A.

The shapes of the slits 200a and 200b according to the present embodiment are the same as the shape of the slit 200 according to the first embodiment. Specifically, as shown in FIG. 13, the length L200a of the slit 200a in the tire width direction TW and the length L200b of the slit 200b in the tire width direction TW are the same as the length L200 of the slit 200 according to the first embodiment. Further, the depth D200a of the slit 200a in the tire radial direction TD and the depth D200b of the slit 200b in the tire radial direction TD are the same as the depth D200 of the slit 200 according to the first embodiment.

According to the tire 1 of the present embodiment, even when the land portions 80 on both sides of the first groove wall 71 and the second groove wall 73 deforms at the time of tire rolling, since the deformed portion of the land portion 80 is absorbed by the slit 200a and the slit 200b, the compressive force received by the protrusion 100 from the land portion 80 can be suppressed. As a result, the compressive force received from the land portion 80 can be largely suppressed comparing with the case where the protrusion 100A is not provided with the slits 200a and 200b, so that it is possible to suppress cracks from occurring to the protrusion 100A.

The length L200a of the slit 200a and the length L200b of the slit 200b may be different from each other. For example, when the deformation amount of the first groove wall 71 is smaller than the deformation amount of the second groove wall 73, the length L200a may be shorter than the length L200b. Further, the depth D200a of the slit 200a and the depth D200b of the slit 200b may be different from each other. For example, when the deformation amount of the first groove wall 71 is smaller than the deformation amount of the second groove wall 73, the depth D200a may be shallower than the depth D200b.

Accordingly, since it is possible to suppress the formation range of the protrusion 100A from being reduced due to the slits 200a and 200b, it is possible to reliably generate a turbulent flow while suppressing cracks from occurring to the protrusion 100A, and suppress a rise in temperature of the tread portion 10.

Example

Next, examples conducted for verifying the effect of the tire according to the embodiment of the present invention will be described. First, comparative examples 1 and 2 and Examples 1 to 3 shown below were prepared.

The tires according to comparative examples 1 and 2 having a structure in which the protrusion formed in the groove portion linearly continues from one groove wall to the other groove wall were used. The tire according to comparative example 2 having a protrusion having a slit at one end was used.

For the tires according to Examples 1 to 3, the tire according to the above-described first embodiment was used. In other words, the tires according to Examples 1 to 3 having the protrusion which is continuous from one groove wall to the other groove wall, and has curved portions were used. Specifically, the tires according to Examples 1 to 3 having the protrusion which is configured to have a linear portion at the center and first and second curved portions at both ends of the linear portion were used. Further, the tires according to Examples 1 to 3 having the protrusion with a slit at one end were used. In the tires according to Examples 1 to 3, the curvature radius of the first curved portion and the curvature radius of the second curved portion were both set to 60 mm.

Further, in each of the tires according to comparative examples 1 and 2 and Examples 1 to 3, the width W100 of the protrusion 100 was 2 mm. The tire sizes and rim widths of comparative examples 1 and 2 and Examples 1 to 3 are as follows. Further, detailed configurations of the tires according to comparative examples 1 and 2 and Examples 1 to 3 are as shown in Table 1.

Tire size: 11R22.5
Rim width: 8.25×22.5

Then, the inner pressure of 700 kPa (regular internal pressure) and the load of 3000 kg (approximately 110% load) were applied to the above-mentioned comparative examples 1 and 2 and Examples 1 to 3, and a rolling test using a drum testing apparatus with a drum diameter of 1.7 m was carried out. In addition, in the rolling test, after rolling at a speed of 65 km/hr, the length of a crack generated at the protrusion was measured. The length of the crack was measured at the initial stage when the land portion was worn by rolling 20,000 km and at the middle stage when the land portion was worn by rolling 50,000 km.

Further, the heat radiation properties according to comparative examples 1 and 2 and Examples 1 to 3 were checked. Specifically, the heat radiation properties were checked based on the measurement result obtained by conducting a test for measuring respective thermal conductivities.

Table 1 shows the measurement results after the rolling test and the measurement results of the thermal conductivity. Incidentally, the crack length shown in Table 1 is indicated by an index with comparative example 1 as a reference (100), and indicates that the larger the value, the higher the effect of suppressing cracks. The thermal conductivity shown in Table 1 is indicated by an index with comparative example 1 as a reference (100), and indicates that the larger the value, the higher the thermal conductivity.

TABLE 1

|  | Comparative Example 1 | Comparative Example 2 | Example 1 | Example 2 | Example 3 |
|---|---|---|---|---|---|
| Protrusion Height H100 [mm] | 7.2 | 7.2 | 7.2 | 7.2 | 7.2 |
| Slit Depth D200 [mm] | 0 | 1.2 | 1.4 | 3.5 | 6.5 |
| Groove Width W [mm] | 12.6 | 12.6 | 12.6 | 12.6 | 12.6 |
| Slit Length in Tire Width Direction L200 [mm] | 0 | 0.5 | 0.5 | 1 | 2.5 |
| Depth D200/Height H100 [%] | 0% | 17% | 19% | 49% | 90% |
| Length L200/Groove Width W [%] | 0% | 4% | 4% | 8% | 20% |
| Height H100/Groove Depth D [%] | 50% | 50% | 50% | 50% | 50% |
| Thermal Conductivity [INDEX] | 100 | 100 | 100 | 100 | 100 |
| Crack Length (Initial Stage) [INDEX] | 100 | 105 | 107 | 130 | 115 |
| Crack Length (Middle Stage) [INDEX] | 100 | 100 | 102 | 120 | 110 |
| Slit Present/Absent | Absent | Present | Present | Present | Present |
| Shape of Protrusion | Linear | Linear | Linear at center/ Curved at both ends | Linear at center/ Curved at both ends | Linear at center/ Curved at both ends |

As shown in Table 1, it was verified that the tires according to Examples 1 to 3 had the suppressed lengths of the crack generated in the protrusion comparing with the tires according to comparative examples 1 and 2. That is, it was verified that the tires according to Examples 1 to 3 were able to suppress the crack from occurring to the protrusion.

In addition, it was also verified that the tires according to Examples 1 to 3 were able to ensure the same thermal conductivity as the tires according to comparative examples 1 and 2 and to sufficiently suppress the temperature rise of the tread portion.

Another Embodiments

Next, another embodiment of the present invention will be described. The tire 1 is preferably used for a heavy duty tire (TBR tire) to be mounted on a truck or bus (TB). The tire 1 can be used, for example, as a construction vehicle tire (ORR tire) for a dump truck or an articulated dump running at a crushed stone site, a mine, or a dam site, or as a passenger car tire.

In the above-described embodiment, the case where the groove portion 70 extends in parallel along the tire circumferential direction TC has been described as an example. The groove portion 70 may be inclined by several degrees (for example, 10 degrees or less) with respect to the tire circumferential direction TC.

In the above-described embodiment, the protrusion 100 includes, as the curved portion 120, the first curved portion 121 in one direction of the tire circumferential direction TC and the second curved portion 122 in the other direction of the tire circumferential direction TC. However, it is not limited to this. The protrusion 100 may have one curved portion 120 or three or more curved portions 120. That is, the protrusion 100 may include at least one curved portion 120.

Further, for example, when the deformation amount of the first groove wall 71 is larger than that of the second groove wall 73, the number of the curved portions 120 arranged on the first groove wall 71 side of the linear portion 110 is larger than the number of the curved portions 120 arranged on the second groove wall 73 side of the linear portion 110. Further, in the protrusion 100, the linear portion 110 and the curved portion 120 may be alternately arranged.

In the embodiment described above, the angle θ1 formed between the extending direction of the linear portion 110 of the protrusion 100 and the tire circumferential direction TC is described as an example within the range of 10 to 60 degrees. However, the present invention is not limited to this. The angle θ1 may be outside the range of 10 to 60 degrees.

As described above, the present invention includes various embodiments and the like that are not described here, of course. In addition, various types of invention can be formed by appropriately combining multiple configuration elements disclosed in the embodiment. Therefore, the technical scope of the present invention is determined only by the matters used to specify the invention according to the claim(s), which is appropriate from the above description.

This application claims priority based on Japanese Patent Application No. 2016-063787 filed on Mar. 28, 2016, and the entire contents thereof are herein incorporated by reference.

INDUSTRIAL APPLICABILITY

The tire according to the embodiments of the present invention reliably suppress a rise in temperature of a tread portion while enhancing durability of a protrusion by suppressing cracks from occurring to the protrusion formed in the groove portion.

REFERENCE SIGNS LIST

1 TIRE
5 NORMAL RIM
10 TREAD PORTION
20 SIDEWALL PORTION
30 BEAD PORTION
40 BELT LAYER
52 CARCASS LAYER
60, 70 GROOVE PORTION
71 FIRST GROOVE WALL
72 GROOVE BOTTOM
73 SECOND GROOVE WALL
80 LAND PORTION
81 FIRST LAND PORTION
82 SECOND LAND PORTION
83 THIRD LAND PORTION
100, 100A PROTRUSION
100a FIRST END
100b SECOND END
110 LINEAR PORTION
120 CURVED PORTION
121 FIRST CURVED PORTION
122 SECOND CURVED PORTION
200, 200a, 200b SLIT
300 SHARROW GROOVE
400 SIPE

The invention claimed is:

1. A tire comprising a tread portion including:
 a groove portion extending in a tire circumferential direction;
 a first land portion positioned toward an inner side in a tire width direction and having a first groove wall forming the groove portion; and
 a second land portion facing the first land portion in the tire width direction and having a second groove wall forming the groove portion,
 wherein a protrusion continuing from the first groove wall to the second groove wall is provided at a groove bottom of the groove portion continuing to the first groove wall and the second groove wall,
 wherein in a tread surface view of the tire, the protrusion includes
  a linear portion extending linearly, and
  at least one curved portion continuing to the linear portion and curved toward the tire circumferential direction,
 wherein at least one of a first end of the protrusion connected to the first groove wall and a second end of the protrusion connected to the second groove wall has a slit crossing the protrusion,
 wherein the first land portion has a shallow groove whose depth is shallower than a depth of the groove portion in a tire radial direction, the shallow groove extending at an angle with respect to the tire width direction, and being open to the groove portion,
 wherein the linear portion of the protrusion extends at an angle in a direction that is identical to a direction in which the shallow groove extends at an angle with respect to the tire circumferential direction, and
 wherein a height of the protrusion in the tire radial direction from the groove bottom is greater than 0.03 times and is 0.4 times or less a height of a tread grounding face in the tire radial direction from the groove bottom.

2. The tire according to claim 1, wherein a depth of the slit in the tire radial direction is 19% to 90% of a height of the protrusion in the tire radial direction.

3. The tire according to claim 1, wherein a length of the slit in the tire width direction is 4% to 20% of a groove width of the groove portion in the tire width direction.

4. The tire according to claim 1, wherein in a tread surface view of the tire, a curvature radius of the curved portion is 3 times or more and 10 times or less a groove width of the groove portion in the tire width direction.

5. The tire according to claim 1, wherein the angle formed by a direction in which the linear portion extends and the tire circumferential direction is within the range of 10 degrees to 60 degrees.

6. The tire according to claim 1,
 wherein the first land portion and the second land portion are provided with a plurality of sipes extending in the tire width direction and being open to the groove portion, and terminating in each land portion, and
 wherein the inner ends of the plurality of sipes in the tire radial direction are located at a position identical to a height position of the protrusions or positioned toward an outer side in the tire radial direction.

7. The tire according to claim 6, wherein a sipe formed at a position connecting the first end and the first groove wall or a position connecting the second end and the second groove wall in the tire circumferential direction has an inner end in the tire radial direction which is positioned toward an outer side in the tire radial direction relative to an inner end of another sipe of the plurality of sipes in the tire radial direction.

8. The tire according to claim 6, wherein in the tire circumferential direction, a position connecting the first end of the protrusion and the first groove wall, and a position where the shallow groove is open to the first groove wall are different.

9. The tire according to claim 6, wherein the shallow groove has a depth in the tire radial direction that is shallower than a depth of the sipe.

\* \* \* \* \*